(12) United States Patent
Strohmayer et al.

(10) Patent No.: US 6,604,539 B1
(45) Date of Patent: Aug. 12, 2003

(54) FUEL TANK FOR A MOTOR VEHICLE

(75) Inventors: Manfred Strohmayer, Haar (DE); Norbert Linz, Iphofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 48 days.

(21) Appl. No.: 09/856,709

(22) PCT Filed: Oct. 11, 2000

(86) PCT No.: PCT/EP00/09982

§ 371 (c)(1),
(2), (4) Date: May 25, 2001

(87) PCT Pub. No.: WO01/30601

PCT Pub. Date: May 3, 2001

(30) Foreign Application Priority Data

Oct. 28, 1999 (DE) .......................................... 199 51 969

(51) Int. Cl.⁷ .............................................. F16K 24/04
(52) U.S. Cl. ........................ 137/43; 137/202; 137/587
(58) Field of Search ........................... 137/43, 202, 587

(56) References Cited

U.S. PATENT DOCUMENTS

| | | | | |
|---|---|---|---|---|
| 3,614,960 A | * | 10/1971 | Pfrengle | 137/43 |
| 4,261,477 A | * | 4/1981 | Casimir et al. | 220/746 |
| 4,423,746 A | * | 1/1984 | Scheurenbrand et al. | 137/43 |
| 4,457,443 A | * | 7/1984 | Casimir et al. | 220/746 |
| 4,531,653 A | * | 7/1985 | Sakata | 137/587 |
| 4,799,509 A | * | 1/1989 | Wawra et al. | 137/587 |
| 5,282,497 A | | 2/1994 | Allison | |
| 6,276,387 B1 | * | 8/2001 | Pachciarz et al. | 137/202 |
| 6,336,466 B1 | * | 1/2002 | Ganachaud et al. | 137/202 |

FOREIGN PATENT DOCUMENTS

| | | |
|---|---|---|
| DE | 30 15 189 A1 | 10/1981 |
| DE | 29 12 214 C2 | 2/1983 |
| DE | 34 17 507 A1 | 11/1985 |
| DE | 37 42 259 C1 | 3/1989 |
| DE | 41 21 323 C2 | 3/1996 |
| DE | 197 12 963 A1 | 10/1998 |
| DE | 0 943 476 A1 | 9/1999 |

* cited by examiner

Primary Examiner—Gerald A. Michalsky
(74) Attorney, Agent, or Firm—Crowell & Moring LLP

(57) ABSTRACT

A known fuel tank for a motor vehicle, in which an expansion tank is arranged outside the fuel tank, requires a relatively large space. A fuel tank for a motor vehicle which requires little space is provided by having the expansion tank installed inside the fuel tank, and by having all valves for venting the fuel tank, for limiting a filling level, for controlling a limit pressure defined in the fuel tank, and/or for protecting against leakage in the event of a rollover arranged on the expansion tank.

38 Claims, 2 Drawing Sheets

FUEL TANK FOR A MOTOR VEHICLE

BACKGROUND OF THE INVENTION

The present invention r elates to a fuel tank for a motor vehicle

A fuel tank for a motor vehicle, in which a n expansion (volume) tank is situated outside the fuel tank, is known from German Patent Document DE 41 21 323 C2. Such a construction has the disadvantage that the two tanks require a relatively large amount of space.

SUMMARY OF THE INVENTION

It is an object of the invention to provide a fuel tank for a motor vehicle which requires little space.

A compact construction is achieved as a result of the integration of an expansion tank in the interior of a fuel tank according to the invention. In addition, the fuel tank is easier to mount and can be mounted on the vehicle body, for example, in a perpendicularly guided manner. As a result of integrating the two components, the surfaces to be sealed-off are reduced so that fuel evaporation is reduced.

Because of the compact construction, all tests, for example, with respect to tightness and function, can take place before the installation of the fuel tank into the motor vehicle. All valves for venting the fuel tank, for limiting the filling level, for controlling a limit pressure defined in the fuel tank, and for protecting against leakage in the event of a rollover are advantageously arranged on the expansion tank according to the invention so that the surfaces to be sealed off are reduced and fuel evaporation is therefore reduced.

The fuel tank according to the invention makes controlling fueling and operating ventilation advantageously possible in a horizontal position of the fuel tank, in an inclined position of the fuel tank, and in the event of a rollover. A limit pressure control is also possible when there is excess pressure within the fuel tank.

An embodiment of the invention will be explained in the following by way of reference to the drawings.

DESCRIPTION OF THE PREFERRED EMBODIMENTS

Figure 1:
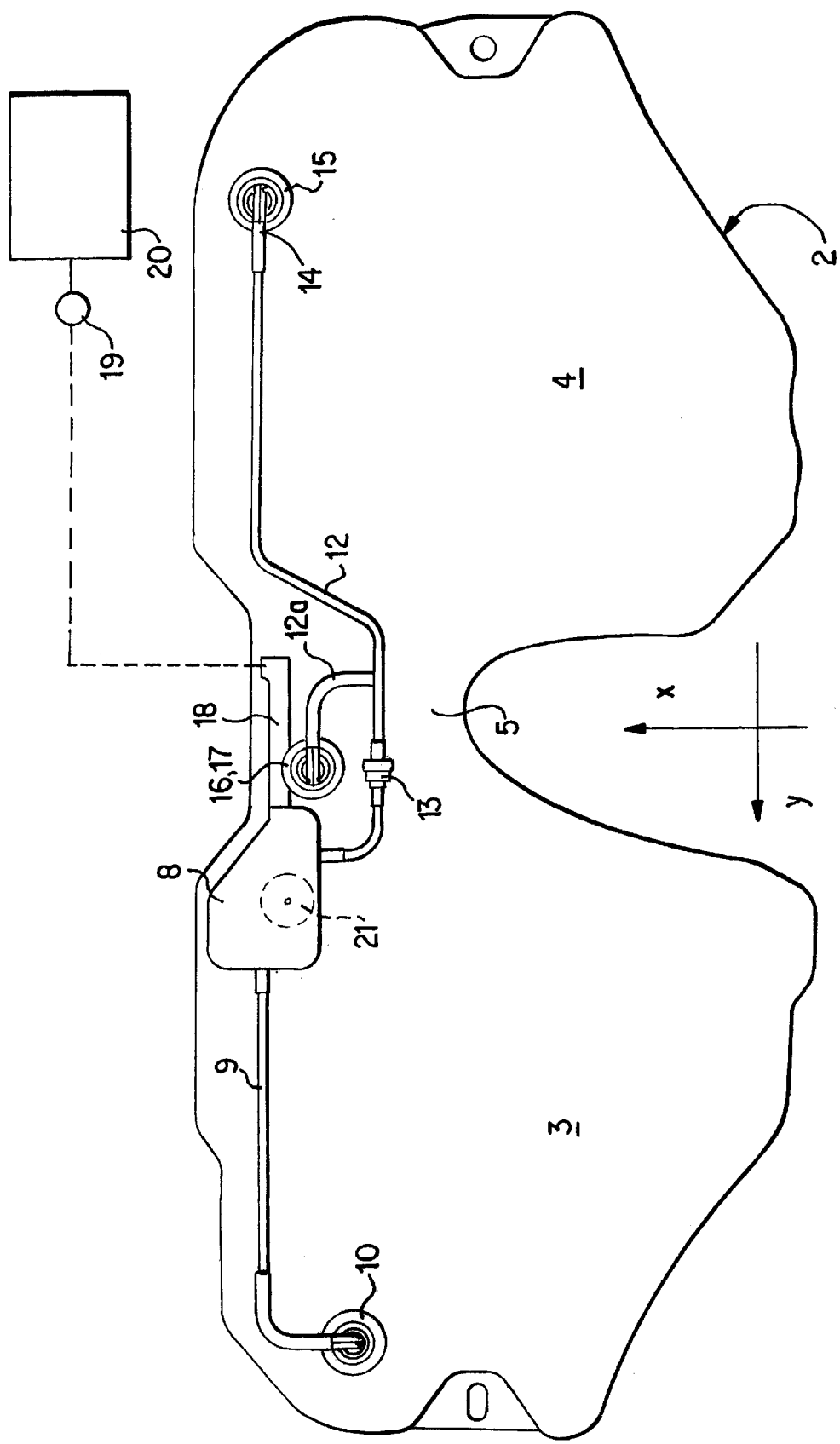
FIG. 1 is a top view of an open fuel tank with a rollover valve arranged outside the fuel tank.
Figure 2:
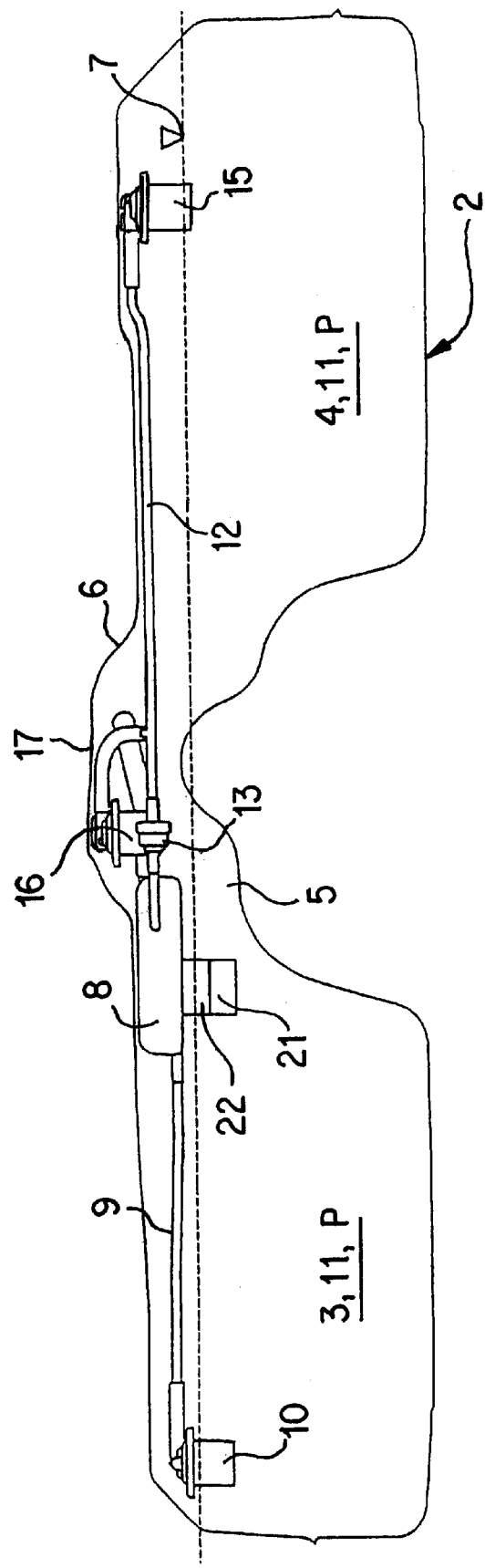
FIG. 2 is a cross-sectional view of a fuel tank in which the rollover valve is situated inside the fuel tank.

FIG. 1 illustrates a fuel tank 2 of a motor vehicle 1 which has two chambers 3 and 4. The two chambers 3 and 4 are connected with one another by way of a saddle or a connection section 5. FIG. 2 illustrates an expansion volume tank or expansion tank 8 arranged within the fuel tank 2 below an upper covering 6 and above a maximal filling level 7 of the fuel tank 2.

In FIG. 1, the position of a filling limiting valve 21 below the expansion tank 8 is indicated by broken lines. In FIG. 2, a rollover valve 22 is integrated above the filling limiting valve 21. In the arrangement in which the rollover valve 22 and the filling limiting valve 21 are integrated, the float valves 10, 15, 16 are desired with an additional rollover function.

During a fueling operation, the filling limiting valve 21 closes when the maximal filling level 7 of the fuel tank 2 or a 100% filling of the fuel tank 2 has been reached.

The expansion tank 8 is connected by way of a pipe 9 with a ventilation or float valve 10. In the illustrated embodiment, the ventilation or float valve is situated in the chamber 3 at such a height that, when the filling level 7 is maximal, the float valve 10 is immersed in fuel 11 situated in the fuel tank 2. The float valve 10 in the chamber 3 is opened in a range in which the fuel quantity situated in the chamber is below the maximal filling level 7 by approximately 10 to 20%. In this manner, the venting in the fuel tank 2 permits "pressureless" filling of the fuel tank 2 until the tank is filled to 80 to 90% of the maximal fuel quantity.

Another pipe 12 is connected to the expansion tank 8. In this pipe 12, a hysteresis or limit pressure control valve 13 is arranged, and at the end 14 of the pipe 12, a venting or float valve 15 is arranged. As illustrated in FIG. 2, the float valve 15 is arranged directly below the upper covering 6 and is still open in a range of the maximal filling level 7 plus an expansion volume of from 3 to 10%. In the illustrated embodiment, another venting or float valve 16 is connected to the pipe 12 between the limit pressure control valve 13 and the float valve 15 by way of a pipe section 12a. In the illustrated embodiment, the float valve 16 is situated at the highest point 17 of the upper covering 6 approximately in the center between the two chambers 3 and 4.

While the float valve 10 closes at a 100% filling of the chamber 3 or of the fuel tank 2 in a horizontal position of the fuel tank 2, the float valve 15 shuts off the pipe 12 in a position of the fuel tank 2 inclined about the longitudinal axis x of the vehicle. The float valve 16 closes when the motor vehicle 1 is inclined upward or downward about the transverse axis of the vehicle.

The limit pressure control valve 13 has the function of preventing overfueling by a slow topping-up. In another function, the limit pressure control valve 13 blocks up to a defined excess pressure range. Starting from a certain excess pressure, which amounts, for example, to 50 mbar, and which is higher than the fueling pressure, which amounts, for example, to 20 mbar, the limit pressure control valve 13 will open up, so that the excess pressure in the fuel tank 2 is reduced.

In the embodiment illustrated in FIG. 1, the gas or the fuel vapor discharged from the expansion tank 8 flows through a pipe 18 to a rollover valve 19 and, from there, to a carbon canister 20 or the like.

What is claimed is:

1. A fuel tank for a motor vehicle comprising:
   an expansion tank, and
   valves for venting the fuel tank, for limiting the filling level, for controlling a limit pressure defined in the fuel tank and for protecting against a leakage in the event of a rollover,
   wherein all of the valves are interconnected with the expansion tank,
   wherein the expansion tank is installed inside the fuel tank, and
   wherein one of said valves is a venting valve which closes in a horizontal position of the fuel tank when a maximal filling level has been reached.

2. The fuel tank according to claim 1, wherein the valves include at least one additional venting valve arranged above the maximal filling level which closes when the fuel tank is inclined about a longitudinal axis of the vehicle, about a transverse axis of the vehicle, or about both the longitudinal and transverse axes of the vehicle, when acted upon with fuel, and/or at a defined excess pressure existing in the fuel tank.

3. The fuel tank according to claim 2, wherein one of said valves is a limit pressure valve connected to the expansion tank, and wherein the limit pressure valve opens when a defined limit pressure in the fuel tank is exceeded.

4. The fuel tank according to claim 2, wherein at least one of said valves is a rollover valve connected to the expansion tank, and wherein the rollover valve is situated outside or inside the fuel tank.

5. The fuel tank according to claim 2, and further comprising a carbon canister connected to the expansion tank by which venting can take place.

6. The fuel tank according to claim 2, wherein one of said valves is a float valve which will not close before the fuel tank is 100% filled and an expansion volume of 3 to 10% is present in the fuel tank.

7. The fuel tank according to claim 2, wherein at least one of said valves is a float valve which closes in the case of an upward and/or downward position of the fuel tank.

8. The fuel tank according to claim 1, wherein the venting valve is opened up to a filling of approximately 80 to 90% of the fuel tank.

9. The fuel tank according to claim 8, wherein one of said valves is a float valve which will not close before the fuel tank is 100% filled and an expansion volume of 3 to 10% is present in the fuel tank.

10. The fuel tank according to claim 8, wherein at least one of said valves is a float valve which closes in the case of an upward and/or downward position of the fuel tank.

11. The fuel tank according to claim 1, wherein at least one of said valves is a filling limiting valve arranged on the expansion tank, and wherein the filling limiting valve closes when a maximal filling level has been reached during a fueling operation.

12. The fuel tank according to claim 11, wherein the filling limiting valve closes when the fuel tank is 100% filled.

13. The fuel tank according to claim 1, wherein one of said valves is a limit pressure valve connected to the expansion tank, and wherein the limit pressure valve opens when a defined limit pressure in the fuel tank is exceeded.

14. The fuel tank according to claim 1, wherein at least one of said valves is a rollover valve connected to the expansion tank, and wherein the rollover valve is situated outside or inside the fuel tank.

15. The fuel tank according to claim 1, and further comprising a carbon canister connected to the expansion tank by which venting can take place.

16. The fuel tank according to claim 1, wherein one of said valves is a float valve which will not close before the fuel tank is 100% filled and an expansion volume of 3 to 10% is present in the fuel tank.

17. The fuel tank according to claim 1, wherein at least one of said valves is a float valve which closes in the case of an upward and/or downward position of the fuel tank.

18. A fuel tank for a motor vehicle comprising:

an expansion tank, and valves for venting the fuel tank, for limiting the filling level, for controlling a limit pressure defined in the fuel tank and for protecting against a leakage in the event of a rollover, wherein all of the valves are interconnected with the expansion tank, wherein the expansion tank is installed inside the fuel tank, wherein at least one of said valves is a filling limiting valve arranged below the expansion tank, and wherein the filling limiting valve closes when a maximal filling level has been reached during a fueling operation.

19. The fuel tank according to claim 18, wherein the filling limiting valve closes when the fuel tank is 100% filled.

20. The fuel tank according to claim 19, wherein one of said valves is a float valve which will not close before the fuel tank is 100% filled and an expansion volume of 3 to 10% is present in the fuel tank.

21. The fuel tank according to claim 19, wherein at least one of said valves is a float valve which closes in the case of an upward and/or downward position of the fuel tank.

22. The fuel tank according to claim 18, wherein one of said valves is a limit pressure valve connected to the expansion tank, and wherein the limit pressure valve opens when a defined limit pressure in the fuel tank is exceeded.

23. The fuel tank according to claim 18, wherein at least one of said valves is a rollover valve connected to the expansion tank, and wherein the rollover valve is situated outside or inside the fuel tank.

24. The fuel tank according to claim 18, and further comprising a carbon canister connected to the expansion tank by which venting can take place.

25. The fuel tank according to claim 18, wherein one of said valves is a float valve which will not close before the fuel tank is 100% filled and an expansion volume of 3 to 10% is present in the fuel tank.

26. The fuel tank according to claim 18, wherein at least one of said valves is a float valve which closes in the case of an upward and/or downward position of the fuel tank.

27. A fuel tank for a motor vehicle comprising:

an expansion tank, and valves for venting the fuel tank, for limiting the filling level, for controlling a limit pressure defined in the fuel tank and for protecting against a leakage in the event of a rollover, wherein all of the valves are interconnected with the expansion tank, wherein the expansion tank is installed inside the fuel tank, wherein one of said valves is a limit pressure valve connected to the expansion tank, and wherein the limit pressure valve opens when a defined limit pressure in the fuel tank is exceeded.

28. The fuel tank according to claim 27, wherein at least one of said valves is a rollover valve connected to the expansion tank, and wherein the rollover valve is situated outside or inside the fuel tank.

29. The fuel tank according to claim 27, and further comprising a carbon canister connected to the expansion tank by which venting can take place.

30. The fuel tank according to claim 27, wherein one of said valves is a float valve which will not close before the fuel tank is 100% filled and an expansion volume of 3 to 10% is present in the fuel tank.

31. The fuel tank according to claim 27, wherein at least one of said valves is a float valve which closes in the case of an upward and/or downward position of the fuel tank.

32. A fuel tank for a motor vehicle comprising:

an expansion tank, and valves for venting the fuel tank, for limiting the filling level, for controlling a limit pressure defined in the fuel tank and for protecting against a leakage in the event of a rollover, wherein all of the valves are interconnected with the expansion tank, wherein the expansion tank is installed inside the fuel tank, and wherein one of said valves is a float valve which will not close before the fuel tank is 100% filled and an expansion volume of 3 to 10% is present in the fuel tank.

33. The fuel tank according to claim 32, wherein at least one of said valves is a float valve which closes in the case of an upward and/or downward position of the fuel tank.

34. A fuel tank for a motor vehicle comprising:

an expansion tank, and valves for venting the fuel tank, for limiting the filling level, for controlling a limit pressure defined in the fuel tank and for protecting against a leakage in the event of a rollover, wherein all of the valves are interconnected with the expansion tank, wherein the expansion tank is installed inside the fuel tank, and wherein at least one of said valves is a float valve which closes in the case of an upward and/or downward position of the fuel tank.

35. A fuel tank for a motor vehicle comprising:

an expansion tank, and valves for venting the fuel tank, for limiting the filling level, for controlling a limit pressure defined in the fuel tank and for protecting against a leakage in the event of a rollover, wherein all of the valves are interconnected with the expansion tank, wherein the expansion tank is installed inside the fuel tank, wherein at least one of said valves is a rollover valve connected to the expansion tank, wherein the rollover valve is situated outside or inside the fuel tank, and wherein one of said valves is a float valve which will not close before the fuel tank is 100% filled and an expansion volume of 3 to 10% is present in the fuel tank.

36. A fuel tank for a motor vehicle comprising:

an expansion tank, valves for venting the fuel tank, for limiting the filling level, for controlling a limit pressure defined in the fuel tank and for protecting against a leakage in the event of a rollover, and a carbon canister connected to the expansion tank by which venting can take place, wherein all of the valves are interconnected with the expansion tank, wherein the expansion tank is installed inside the fuel tank, and wherein one of said valves is a float valve which will not close before the fuel tank is 100% filled and an expansion volume of 3 to 10% is present in the fuel tank.

37. A fuel tank for a motor vehicle comprising:

an expansion tank, and valves for venting the fuel tank, for limiting the filling level, for controlling a limit pressure defined in the fuel tank and for protecting against a leakage in the event of a rollover, wherein all of the valves are interconnected with the expansion tank, wherein the expansion tank is installed inside the fuel tank, wherein at least one of said valves is a rollover valve connected to the expansion tank, wherein the rollover valve is situated outside or inside the fuel tank, and wherein at least one of said valves is a float valve which closes in the case of an upward and/or downward position of the fuel tank.

38. A fuel tank for a motor vehicle comprising:

an expansion tank, valves for venting the fuel tank, for limiting the filling level, for controlling a limit pressure defined in the fuel tank and for protecting against a leakage in the event of a rollover, and a carbon cannister connected to the expansion tank by which venting can take place, wherein all of the valves are interconnected with the expansion tank, wherein the expansion tank is installed inside the fuel tank, and wherein at least one of said valves is a float valve which closes in the case of an upward and/or downward position of the fuel tank.

* * * * *